(12) United States Patent
Liu et al.

(10) Patent No.: US 10,943,351 B2
(45) Date of Patent: Mar. 9, 2021

(54) METHOD FOR SEGMENTING 3D DIGITAL MODEL OF JAW

(71) Applicant: Wuxi EA Medical Instruments Technologies Limited, Jiangsu (CN)

(72) Inventors: Xiaolin Liu, Shanghai (CN); Yang Feng, Shanghai (CN); Bowen Zhou, Shanghai (CN)

(73) Assignee: Wuxi EA Medical Instruments Technologies Limited

( * ) Notice: Subject to any disclaimer, the term of this patent is extended or adjusted under 35 U.S.C. 154(b) by 78 days.

(21) Appl. No.: 16/463,229

(22) PCT Filed: Feb. 5, 2018

(86) PCT No.: PCT/CN2018/075256
§ 371 (c)(1),
(2) Date: May 22, 2019

(87) PCT Pub. No.: WO2018/218988
PCT Pub. Date: Dec. 6, 2018

(65) Prior Publication Data
US 2019/0333224 A1    Oct. 31, 2019

(30) Foreign Application Priority Data

Jun. 1, 2017    (CN) .......................... 201710403222.1

(51) Int. Cl.
*G06T 7/12*    (2017.01)
*G06K 9/62*    (2006.01)
*G06T 7/00*    (2017.01)

(52) U.S. Cl.
CPC .............. *G06T 7/12* (2017.01); *G06K 9/6218* (2013.01); *G06T 7/0012* (2013.01);
(Continued)

(58) Field of Classification Search
CPC ..... G06T 7/12; G06T 7/0012; G06T 2200/04; G06T 2207/20081; G06T 2207/20084;
(Continued)

(56) References Cited

U.S. PATENT DOCUMENTS

2002/0028418 A1* 3/2002 Farag ...................... G06T 17/00
                                                                433/29
2006/0098008 A1    5/2006 Holberg
(Continued)

FOREIGN PATENT DOCUMENTS

| CN | 101706971 | 5/2010 |
| CN | 106296699 | 1/2017 |
| CN | 106780460 | 5/2017 |

OTHER PUBLICATIONS

Fully Automated Segmentation of Alveolar Bone Using Deep Convolutional Neural Networks from Intraoral Ultrasound Images 2019 (Year: 2019).*
(Continued)

*Primary Examiner* — Nizar N Sivji
(74) *Attorney, Agent, or Firm* — Forge IP, PLLC

(57) ABSTRACT

A method for segmenting 3D digital model of jaw is provided. The method includes: obtaining a first 3D digital model of jaw; and segmenting the first 3D digital model of jaw using a trained deep artificial neural networks.

11 Claims, 3 Drawing Sheets

(52) U.S. Cl.
CPC .............. *G06T 2200/04* (2013.01); *G06T 2207/20081* (2013.01); *G06T 2207/20084* (2013.01); *G06T 2207/30036* (2013.01)

(58) Field of Classification Search
CPC ........ G06T 2207/30036; G06K 9/6218; G06K 9/00221; G06K 9/6256; G06K 9/62; G06N 5/048; G06N 5/04; G06N 3/0481; G06N 3/082; G06N 3/0454
See application file for complete search history.

(56) References Cited

U.S. PATENT DOCUMENTS

| | | | | |
|---|---|---|---|---|
| 2013/0218531 | A1* | 8/2013 | Deichmann | A61C 13/0004 703/1 |
| 2015/0019214 | A1* | 1/2015 | Wang | G10L 15/34 704/232 |
| 2015/0320320 | A1* | 11/2015 | Kopelman | A61B 1/24 433/24 |
| 2016/0004811 | A1* | 1/2016 | Somasundaram | G06T 7/11 703/11 |
| 2016/0220173 | A1* | 8/2016 | Ribnick | A61B 5/0062 |
| 2018/0005371 | A1* | 1/2018 | Sabina | G06T 7/11 |
| 2018/0028294 | A1* | 2/2018 | Azernikov | A61C 13/0004 |
| 2018/0168780 | A1* | 6/2018 | Kopelman | G06T 19/006 |
| 2019/0029522 | A1* | 1/2019 | Sato | A61B 5/7257 |
| 2020/0170760 | A1* | 6/2020 | Dawood | G06K 9/00214 |
| 2020/0320685 | A1* | 10/2020 | Anssari Moin | G06T 11/005 |

OTHER PUBLICATIONS

Automated Segmentation of Gingival Diseases from Oral Images 2017 (Year: 2017).*

* cited by examiner

METHOD FOR SEGMENTING 3D DIGITAL MODEL OF JAW

CROSS-REFERENCE TO RELATED APPLICATIONS

This application claims priority from Chinese Patent Application Serial Number 201710403222.1 filed Jun. 1, 2017, which is incorporated herein by reference in its entirety.

FIELD OF THE APPLICATION

The present application is generally related to a method for segmenting three dimensional digital model of jaw, more specifically a method for segmenting three dimensional digital model of jaw using deep artificial neural networks.

BACKGROUND

Nowadays, it is more and more dependent on computer aided methods in dental area. For instance, in many cases, it is needed to segment three dimensional (hereinafter "3D") digital model of jaw to divide dental crown from gingiva and to divide adjacent dental crowns from each other.

Although manual segmentation of 3D digital model of jaw through computer user interface has the advantage of high precision, it has the drawback of low efficiency.

Computer automatic segmentation of 3D digital model of jaw basis curvature calculation or skeleton extraction technology can free manpower, however it has the following drawbacks: (1) accuracy of segmentation of non-standard 3D digital model of jaw (for example, a jaw missing a tooth or having an extra tooth, a jaw having a tooth whose shape is not regular, or the 3D digital model having high noise) is relatively low; (2) it is difficult to obtain smooth gingival line; and (3) it is sensitive to noise, as a result, it has relatively high requirement for quality of 3D digital model.

Therefore, a new method for segmenting 3D digital model of jaw is needed.

SUMMARY

In one aspect, the present application provides a method for segmenting 3D digital model of jaw. The method includes: obtaining a first 3D digital model of jaw; and segmenting the first 3D digital model of jaw using a trained deep artificial neural network.

In some embodiments, the trained deep artificial neural networks may be trained using multiple segmented 3D digital models of jaw.

In some embodiments, the method may further include: simplifying the first 3D digital model of jaw before the segmenting.

In some embodiments, gingiva part of the first 3D digital model of jaw may be more simplified than teeth part.

In some embodiments, the simplifying may be basis contraction of vertices of facets.

In some embodiments, algorithm of the simplifying may contain a component of angle between adjacent facets, to lower the probability that two adjacent facets having a small angle therebetween will be simplified.

In some embodiments, the method may further include: optimizing boundaries obtained by the segmenting, the optimizing is basis a fuzzy clustering algorithm, the fuzzy clustering algorithm contains a component of angle between adjacent facets, to increase the probability that a common side of two adjacent facets having a small angle therebetween will be identified as a part of a boundary.

In some embodiments, the artificial neural networks may be convolutional neural networks.

In some embodiments, the artificial neural networks may include a first convolutional neural networks and a second convolutional neural networks, where the first convolutional neural networks is for classifying facets into one of gingiva and tooth, and the second convolutional neural networks is for classifying the facets, classified by the first convolutional neural networks into tooth, into one of different tooth types.

In some embodiments, the second convolutional neural networks is able to classify facets into one of eight tooth types: central incisor, lateral incisor, canine, first premolar, second premolar, first molar, second molar and third molar.

In some embodiments, at least one of the first and the second convolutional neural networks may include the structure of "convolution layer-convolution layer-pool layer".

In some embodiments, at least one of the first and the second convolutional neural networks may include the structure of "convolution layer-convolution layer-pool layer-convolution layer-convolution layer-pool layer".

In some embodiments, at least one of the first and the second convolutional neural networks may include the structure of "full connected layer-dropout-full connected layer".

BRIEF DESCRIPTION OF THE DRAWINGS

The above and other features of the present application is described in greater detail below in combination with the accompanying drawings. It is understandable that the drawings are for illustrating some exemplary embodiments of the present application only, and shall not be deemed as restriction of the scope of the present application. The drawings may be disproportional, and similar symbols typically identify similar components, unless context dictates otherwise.

DETAILED DESCRIPTION OF ILLUSTRATED EMBODIMENTS

In the following detailed description, reference is made to the accompanying drawings, which form a part hereof. The illustrative embodiments described in the detailed description, drawings, and claims are not meant to be limiting. Other embodiments may be utilized, and other changes may be made, without departing from the spirit or scope of the subject matter presented here. It will be readily understood that the aspects of the present disclosure, as generally described herein, and illustrated in the Figures, can be arranged, substituted, combined, and designed in a wide variety of different configurations, all of which are explicitly contemplated and make part of this disclosure.

In one aspect, a method for segmenting 3D digital model of jaw using a trained deep artificial neural networks is provided. An examplary embodiment basis convolutional neural networks will be described in detail below. Basically, deep learning uses low-level features to build more abstract high-level features, to discover distributed feature representation of data.

Figure 1:
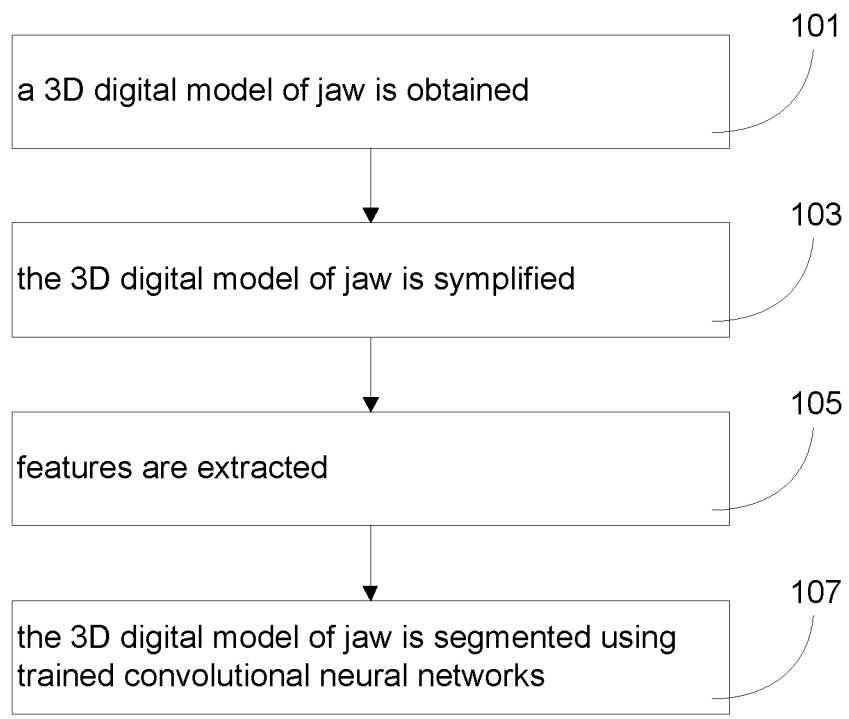
FIG. 1 illustrates a schematic flow chart of a method for segmenting 3D digital model of jaw according to one embodiment of the present application.

FIG. 1 illustrates a schematic flow chart of a method 100 for segmenting 3D digital model of jaw according to one embodiment.

In 101, a 3D digital model of jaw is obtained.

In some embodiments, a 3D digital model of jaw may be obtained by scanning a jaw of a patient directly. In some embodiments, a 3D digital model of jaw may be obtained by scanning a solid model of jaw, such as a plaster model of jaw. In some embodiments, a 3D digital model of jaw may be obtained by scanning a bite impression of a patient.

In one embodiment, a 3D digital model of jaw may be constructed basis triangular mesh, and in below exemplary embodiment, triangular mesh digital models are used. Inspired by the present application, one skilled in the art understands that a 3D digital model may also be constructed basis any suitable mesh such as quadrilateral mesh, pentagonal mesh and hexagonal mesh etc.

In 103, the 3D digital model of jaw is simplified.

In one embodiment, the 3D digital model of jaw obtained in 101 may be simplified to improve efficiency of subsequent calculations.

In one embodiment, simplification of the 3D digital model of jaw may be based on contraction of vertices of facets. Triangular patches, which the 3D digital model of jaw is constructed of, may be called facets.

In one embodiment, simplification of the 3D digital model of jaw may be based on Quadric Error Metrics.

A Q matrix may be calculated according to Equation (1) for each pair of vertices:

$$Q = \Sigma_{p \in planes(v)} K_p \quad \text{Equation (1)}$$

wherein, planes(v) stands for a set of planes of facets defined by original vertices (vertices of facets of un-simplified 3D digital model of jaw), and $K_p$ may be written as:

$$K_p = pp^T = \begin{bmatrix} a^2 & ab & ac & ad \\ ab & b^2 & bc & bd \\ ac & bc & c^2 & cd \\ ad & bd & cd & d^2 \end{bmatrix} \quad \text{Equation (2)}$$

wherein, p may be written as:

$$p = [a\ b\ c\ d]^T \quad \text{Equation (3)}$$

wherein, p stands for coefficients of plane equation (4), $$ax + by + cz + d = 0 \quad \text{Equation (4)}$$

where, $$a^2 + b^2 + c^2 = 1 \quad \text{Equation (5)}$$

In one embodiment, an optimal contraction target and its error may be calculated for each pair of vertices. A set of vertex pairs having the minimum total contraction error may be identified by iteration and be contracted accordingly, and errors of related sides may be updated then.

In one embodiment, an energy minimization function may be used to roughly segment the 3D digital model into teeth part, gingival line and gingiva part, and different parts may be simplified at different degrees. In one embodiment, gingiva part may be more simplified, and gingival line and teeth part may be less simplified. In one embodiment, the energy minimization function of Equation (6) may be used.

$$E(x) = \Sigma_{i \in v} E_{unary}(i) + \lambda \Sigma_{(i,j) \in \varepsilon} E_{pairwise}(i,j) \quad \text{Equation (6)}$$

where, v stands for the facet set of the 3D digital model of jaw, E stands for a set of relationship types of adjacent facets, which includes tooth-tooth, gingiva-gingiva, gingival line-gingival line, gingiva-gingival line and tooth-gingival line.

where, $E_{unary}$ stands for a simplification weight given to a facet basis where it locates, to keep as many features (such as gingival line and crown information etc.) as possible on the simplified digital model, it may be written as:

$$E_{unary} = \varepsilon_1 E1 + \varepsilon_2 E2 - \varepsilon_3 E3 \quad \text{Equation (7)}$$

where, $$\varepsilon_1 + \varepsilon_2 + \varepsilon_3 = 1 \quad \text{Equation (8)}$$

where, E1 stands for energy of possibility that a facet locates on a tooth or gingiva, it is a weight that increases along z axis. E2 stands for a weight given to a facet basis its distance to a local highest point (for example, for a 3D digital model of maxillary jaw, a cusp on a molar has the greatest z coordinate value in local area), the greater the distance the smaller the weight, the shorter the distance the higher possibility that the facet locates on a tooth. E3 stands for a weight given to a facet basis its distance to the center of the 3D digital model of jaw, the greater the distance the greater the weight, this weight is for reducing interference of lingual gingiva.

The greater $E_{unary}$ the higher possibility that the facet locates on a tooth.

where, $E_{pairwise}$ stands for a cost of two adjacent facets, the smaller the angle between two adjacent facets, the more possibility that the two adjacent facets belong to two different parts, and the possibility of contraction of related vertices shall be decreased, where, $E_{pairwise}$ may be written as:

$$E_{pairwise}(i, j) = \begin{cases} \dfrac{w}{1 + \dfrac{Ang_{Dist}}{avg(Ang_{Dist})}} & \text{if } i, j \neq S, T \\ \infty & \text{else} \end{cases} \quad \text{Equation (9)}$$

where, S stands for a set of facets that adjoin to confidence tooth area, T stands for a set of facets that adjoin to confidence gingiva area and other tooth area, w stands for a weight given to $E_{pairwise}$ basis the prediction by the neural networks.

where, $Ang_{Dist}$ stands for angular distance between two adjacent facets, which may be written as:

$$Ang_{Dist(\alpha_{ij})} = \eta(1 - \cos \alpha_{ij}) \quad \text{Equation (10)}$$

where, $\alpha_{ij}$ stands for an angle between normals of facets i and j, $\eta$ is a pre-set small positive number.

In rough segmentation of 3D digital model of jaw, it is desired to keep the segmentation line on gingival line, and to avoid that the segmentation line overlaps with gaps between teeth or grooves on molars. In one embodiment, vertices having maximum curvatures, which are within a predetermined range (k neighborhood), may be identified and selected as seed vertices, which are potential vertices for forming the segmentation line. To avoid that the segmentation line overlaps with gaps between teeth or grooves on molars, among seed vertices, those on gaps between teeth and on grooves on molars shall be excluded, and may be identified and treated as protection vertices. Therefore, weights of sides related to seed vertices may be decreased and weights of sides related to protection vertices may be increased, the smaller the weight the more possibility that a side will constitute a part of the segmentation line.

In one embodiment, to identify seed vertices, curvature calculation may be performed for the whole 3D digital model of jaw, and vertices having maximum curvatures which are within the range [s1,s2] may be identified as seed vertices. In one examplary embodiment, for a 3D digital model of maxillary jaw, s1 may be set to −14.0 and s2 may be set to −0.4.

In one embodiment, a Breadth First Search (BFS) area may be defined for a seed vertex, and two vertices within this area having the greatest geodesic distance may be identified. If the Euclidean distance between these two vertices is smaller than a predetermined threshold, then the seed vertex may be deemed to be on a gap between teeth because this feature matches feature of groove. To improve efficiency of calculation, the above operation may be performed for randomly sampled seed vertices only, those seed vertices nearby may be deemed to be similar.

In one embodiment, BFS may be performed from a local highest seed node, and seed vertices identified in this area may be classified as vertices on tooth grooves.

A simplified 3D digital model of jaw is obtained by simplifying the original 3D digital model of jaw.

In 105, features are extracted.

Features to be fed to convolutional neural networks are extracted basis the simplified 3D model of jaw.

In one embodiment, at least one of the following features may be extracted: Curvature Feature, PCA Feature (Principal Components Analysis), Shape Diameter Feature, Distance from Medial Surface, Average Geodesic Distance, Shape Contexts, Spin Images and Location Feature. Please refer to Evangelos Kalogerakis, Aaron Hertzmann, and Karan Singh. Learning 3D Mesh Segmentation and Labeling. ACM Transactions on Graphics, 29(3), 2010 for extraction of the above mentioned features except Coordinate Feature. Extraction of these features is briefly described below.

1) Curvature Feature

In one embodiment, curvature feature may be extracted using below method.

First, N vertices close to point P may be selected. In one embodiment, to improve efficiency, the searching space may be reduced using neighborhood information.

Then, a plane $F(x,y,z)$ may be fit basis a quadratic matrix that meets the below condition and the N vertices.

$$F(x,y,z)=0 \qquad \text{Equation(11)}$$

After that, $P_0$, mapping of point P, may be calculated basis the matrix, and $P_0$ meets the below condition.

$$F(P_0)=0 \qquad \text{Equation(12)}$$

Curvature characteristic at point $P_0$ may be calculated, which may be taken as the curvature at point P.

If for all the N vertices, $$F(x, y, z) = \begin{bmatrix} x & y & z & 1 \end{bmatrix} \begin{bmatrix} a & e & g & l \\ e & b & f & m \\ g & f & c & n \\ l & m & n & d \end{bmatrix} \begin{bmatrix} x \\ y \\ z \\ 1 \end{bmatrix} = 0 \qquad \text{Equation (13)}$$

where, a~n stand for coefficients for fitting the plane function F(x,y,z).

Then, characteristic values $k_1$ and $k_2$ of matrix $B^{-1}A$ may be taken as principal curvatures, where $$A = \begin{bmatrix} L & M \\ M & N \end{bmatrix} \qquad \text{Equation (14)}$$

$$B = \begin{bmatrix} E & F \\ F & G \end{bmatrix} \qquad \text{Equation (15)}$$

where, E, F and G stand for first order partial derivatives of F(x,y,z), and L, M and N stand for second order partial derivatives of F(x,y,z).

2) PCA Feature

In one embodiment, covariance matrices of centers of local facets within different areas may be constructed, area weight may be given, and singular values s1, s2 and s3 may be calculated. Areas may be determined by geodesic distance based radius, for example, 5%, 10% and 20% etc. Each group may have the following features: s1/(s1+s2+s3), s2/(s1+s2+s3), s3/(s1+s2+s3), (s1+s2)/(s1+s2+s3), (s1+s3)/(s1+s2+s3), (s2+s3)/(s1+s2+s3), s1/s2, s1/s3, s2/s3, s1/s2+s1/s3, s1/s2+s2/s3 and s1/s3+s2/s3.

3) Shape Diameter Feature

In one embodiment, Shape Diameter Feature (hereinafter "SDF") may be such defined: take the center point of a facet as origin, and generate a plurality of rays within a certain angle range, opposite to the normal at the center point. These rays intersect with another surface, and line segments are formed. Then, take a line segment having average length as benchmark, and calculate weighted mean, mid-value and mean square of line segments whose lengths are within a predetermined standard deviation, such weighted mean, mid-value and mean square may be taken as SDF of the center point.

In one embodiment, logarithmic forms of SDF may also be used, one example is illustrated by below equation (16), where corresponding regularizer $\alpha=1, 2, 4, 8$.

$$nsdf(f) = \log\left(\frac{sdf(f) - \min(sdf)}{\max(sdf) - \min(sdf)} * \alpha + 1\right) \Big/ \log(\alpha + 1) \qquad \text{Equation (16)}$$

4) Distance from Medial Surface

In one embodiment, the center of a facet may be defined to be the point whose x-coordinate is the average of the x-coordinates of the vertices of the facet, whose y-coordinate is the average of the y-coordinates of the vertices of the facet, and whose z-coordinate is the average of the z-coordinates of the vertices of the facet. Then, take the center point as a point of tangency, and find the largest inscribed sphere within the 3D model. Take the center of the inscribed sphere as origin, generate evenly spaced rays which intersect with the surface of the 3D model and form line segments. Weighted mean, mid-value and mean square of the line segments may be taken as a feature. In one embodiment, regularized and/or logarithmic versions of the feature may also be used.

5) Average Geodesic Distance

This feature may be used to describe dispersion degree of facets. In one embodiment, geodesic distance between every two facet center points may be calculated, and then the average geodesic distance may be calculated and taken as the feature. In addition, mean square and distribution of the geodesic distances may also be added as part of the feature. The feature may be normalized.

6) Shape Contexts

In one embodiment, for each facet, distribution of other facets (area weighted) may be calculated and taken as shape contexts feature, which can be described with facet normal vector and logarithmic geodesic distance. In one embodiment, six angle intervals and six geodesic distance intervals may be defined.

7) Spin Images

In one embodiment, this feature may be calculated according to below method. First, take normal vector of vertex P as central axis, and establish a cylindrical coordinate system. Then, project points in 3D space onto 2D spin image according to below equation (17):

$$S_0(X) \rightarrow (\alpha, \beta) = \sqrt{\|X-P\|^2 - (n(X-P))^2}, n(X-P) \qquad \text{Equation (17)}$$

where, $\alpha$ stands for radial distance to the normal vector n, $\beta$ stands for axial distance to the plane of tangency, n stands for the normal vector at vertex P, X stands for coordinate (x,y,z) of a point in 3D space.

8) Coordinate Feature

In one embodiment, the following 7 coordinate features may be used: x, y and z coordinate values of the vertex, distance r from the origin of coordinate to the vertex, angle $\theta$ between z axis and a line which passes through the origin of coordinate and the vertex, angle $\varphi$ and $|\varphi|$ between y axis and a line which passes through the origin of coordinate and the vertex.

Based on the above, 600 features may be obtained, which may form a 20*30 feature matrix. Please refer to below table 1 for feature dimension.

TABLE 1

| Feature | CUR | PCA | SC | AGD | SDF | DIS | SI | CD | Total |
|---|---|---|---|---|---|---|---|---|---|
| Dimension | 64 | 48 | 270 | 15 | 72 | 24 | 100 | 7 | 600 |

After feature extraction is finished, the extracted features may be fed to trained neural networks for classifying/teeth segmenting.

In 107, 3D digital model of jaw is segmented using trained convolutional neural networks.

In one embodiment, Caffe deep learning platform and python may be used to construct convolutional neural networks.

Figure 2:
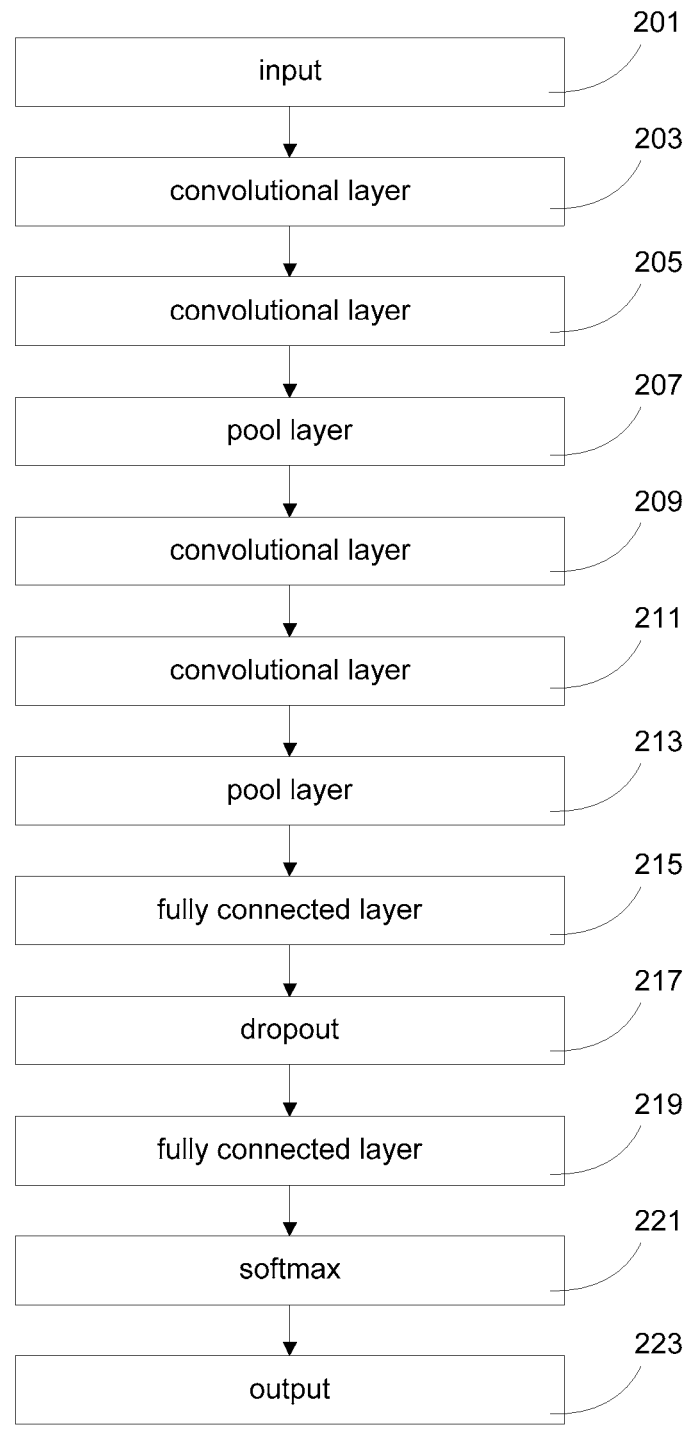
FIG. 2 illustrates a schematic diagram of a convolutional neural networks according to one embodiment of the present application.

Referring to FIG. 2, schematically illustrates structure of convolutional neural network 200 according to one embodiment. Convolutional neural network 200 includes the following layers: input layer 201, convolutional layer 203, convolutional layer 205, pool layer 207, convolutional layer 209, convolutional layer 211, pool layer 213, fully connected layer 215, dropout layer 217, fully connected layer 219, softmax layer 221, and output layer 223.

The "convolutional layer-convolutional layer-pool layer" structure is able to reduce sensitivity to local feature, improve efficiency, lower the possibility of over-fitting, and reduce the influence of noise.

In this embodiment, four convolutional layers are used to fully analyze feature data, extract local information, and generate better weights. Two pool layers are used to keep a part of global information, and to prevent over-fitting to a certain extent.

Compared with "fully connected layer-fully connected layer" structure, "fully connected layer-dropout layer-fully connected layer" structure is able to better prevent over-fitting and improve prediction accuracy.

Dropout layer is able to prevent over-fitting to a certain extent.

In one embodiment, parameter type of Softmax layer may be set according to practical requirement.

In one embodiment, parameters of a convolutional layer can be defined in this way [convolution kernel height, convolution kernel width, number of feature channels, number of convolution kernels].

In one embodiment, parameters of convolutional layer 203 may be set as [3, 5, 1, 6], parameters of convolutional layer 205 may be set as [3, 3, 16, 32], parameters of convolutional layer 209 may be set as [3, 3, 32, 64], and parameters of convolutional layer 211 may be set as [3, 3, 64, 128].

In one embodiment, parameters of a pool layer can be defined in this way [pooling kernel height, pooling kernel width, pooling type].

In one embodiment, parameters of pool layer 207 may be set as [2, 2, max], parameters of pool layer 213 may be set as [2, 2, max].

In one embodiment, parameters of a fully connected layer can be defined in this way [number of inputs, number of outputs].

In one embodiment, parameters of fully connected layer 215 may be set as [1024, 100], parameters of fully connected layer 219 may be set as [100, 2 (or 8)].

In one embodiment, parameters of a dropout layer can be defined in this way [dropout ratio].

In one embodiment, parameters of dropout layer 217 may be set as [0.5].

In one embodiment, PReLu is used as activation function, to prevent gradient vanishing problem to a certain extent.

In one embodiment, to improve classification accuracy, two neural network models may be used, a first neural network model is for classifying facets into one of tooth and gingiva, a second neural network is for classifying facets into one of eight different teeth (i.e. central incisor, literal incisor, canine, first premolar, second premolar, first molar, second molar and third molar). When the first neural network model is fed extracted features, it outputs a binary classification result. When the second neural network model is fed features of teeth part classified by the first neural network, it outputs an eight class classification result. Inspired by the present application, a skilled in the art understands that the second neural network model may also be a sixteen class classification model, for classifying facets into one of the right eight teeth and the left eight teeth.

In one embodiment, both the first and the second neural network models may use the structure of convolutional neural network 200 as illustrated in FIG. 2. When features extracted in 105 is fed to the first neural network model, it outputs a binary classification result. When features of teeth part classified by the first neural network are fed to the second neural network model, it outputs an eight class classification result.

After convolutional neural network models are constructed, they shall be trained to enable them to segment 3D digital model of jaw. In one embodiment, training parameters may be set as follows (parameter values are provided in brackets): learning rate (0.01), momentum (0.9), weight_decay (0.005), lr_policy (poly), power (0.75), solver_mode (GPU).

In one embodiment, segmented 3D digital models of jaw may be used to train convolutional neural networks, such as manually segmented 3D digital models of jaw.

A 3D digital model of jaw can be segmented by feeding its features extracted in 105 to the trained convolutional neural networks.

In some cases, facet classification of convolutional neural networks may not be perfectly accurate, it may only roughly differentiate between different areas of jaw, and the result may not be continuous, therefore, it is necessary to optimize the result.

Please refer to "Fast Approximate Energy Minimization Via Graph Cuts" IEEE TPAMI23, 11, 1222-1239. 2001. by Y. Boykov, O. Veksler, and R. Zabih, the multi-label graph-cut method introduced in this article may be used to carry out multi-class optimization. Please refer to "3D Mesh Labeling Via Deep Convolutional Neural Networks" Acm Transactions on Graphics, 35(1); 3, 2015 by Kan Guo, Dongqing Zhou, and Xiaowu Chen, energy function may be established with reference to definition of Mesh Label Optimization in this article. Use T to represent facet set, use t to represent one facet, use $p_t$ to represent the possibility that facet t is classified into $l_t$, use $N_t$ to represent a facet adjacent to facet t, and the following minimized energy function may be established:

$$E = \min_{\{l_t, t \in T\}} \sum_{t \in T} \xi U(p_t, l_t) + \lambda \sum_{t \in T, v \in N_t} \xi S(p_t, p_v, l_t, l_v) \quad \text{Equation (18)}$$

where, $\lambda$, is a non-negative number. In one embodiment, for classifying facets into one of tooth and gingiva, $\lambda$, may be set to 20; and for classifying facets into one of eight teeth, $\lambda$, may be set to 100; for mapping to the original 3D model, $\lambda$, may be set to 50.

where, the first term of Equation (18) may be defined as follows:

$$\xi U(p_t, l_t) = -\log_{10}(p_t(l_t)) \quad \text{Equation (19)}$$

where, the second term of Equation (18) may be defined as follows:

$$\sum_{t \in T, v \in N_t} \xi S(p_t, p_v, l_t, l_v) = \begin{cases} 0 & \text{if } l_t = l_v \\ -\log\left(\frac{\theta_{tv}}{\pi}\right)\phi_{tv}, & \text{if } l_t \neq l_v \text{ and dihedral angle is concave} \\ -(1 + |n_t \cdot n_t|)\log\left(\frac{\theta_{tv}}{\pi}\right)\phi_{tv}, & \text{if } l_t \neq l_v \text{ and dihedral angle is convex} \end{cases} \quad \text{Equation (20)}$$

where, v stands for a facet in neighbourhood of facet t.

After gingiva is removed, facets are classified into one of eight teeth, because of bilateral symmetry of jaws, left side and right side are not distinguished from each other during the classification. Because a jaw is laterally symmetric about an axis, left side and right side teeth can be distinguished basis their coordinates.

In one example, wherein Y axis is symmetry axis, except central incisors, the rest teeth can be determined whether they belong to the left side or the right side basis signs of their X coordinates. For left and right central incisors, they can be segmented using a line calculated using below minimized energy function basis X coordinates:

$$E_{left/right} = \Sigma_{t \in T} \xi U(p_t, l_t) + \lambda \Sigma_{t \in T, v \in N_t} \xi S(p_t, p_v, l_t, l_v) \quad \text{Equation (21)}$$

In one embodiment, X axis can be such set that if X coordinate of a facet is greater than zero, it belongs to left side, otherwise it belongs to right side. The first term of Equation (21) may be defined as follows:

$$P'_t = \max\left(\min\left(\frac{f_{tx}}{maxWidth}, maxProb\right), minProb\right) \quad \text{Equation (22)}$$

$$P_t = P'_t(maxProb - minProb) + 0.5 * (maxProb + minProb) \quad \text{Equation (23)}$$

$$\xi U(p_t, l_t) = \begin{cases} -\log(P_t), & \text{if } l_t = \text{letf tooth} \\ -\log(1 - P_t), & \text{if } l_t = \text{right tooth} \end{cases} \quad \text{Equation (24)}$$

where, $f_{tx}$ stands for X coordinate of central point of facet t, in one embodiment, default value of maxWidth may be set to 12, default value of minProb may be set to $10^{-8}$, maxProb=1−minProb.

In some cases, a facet of a tooth may be classified into an adjacent tooth, and such facets shall be correctly labeled. After experiments, it is found that: (1) teeth adjoin usually happens on adjacent teeth; (2) incorrect labeling usually only bias by one tooth position; (3) if there is only one second premolar, it can be easily labeled as first premolar by mistake.

In one embodiment, PCA analysis may be used to determine whether there is teeth adjoin. First, PCA analysis is conducted for each tooth. Then, the longest axis is projected on XY plane, and compare the projection with a pre-set threshold (for different teeth, different length thresholds can be set). If the projection is longer than the pre-set threshold, it can be determined that there is teeth adjoin. In one embodiment, graph-cut may be used to segment adjoined teeth. An optimized segmentation line can be calculated basis below minimized energy function:

$$E_{jointed\_teeth} = \Sigma_{t \in T} \xi U(p_t, l_t) + \lambda \Sigma_{t \in T, v \in N_t} \xi S(p_t, p_v, l_t, l_v) \quad \text{Equation (25)}$$

This minimized energy function is similar to that for segmenting left and right central incisors, their second terms have the same definition. In one embodiment, in PCA analysis, if the angle between the longest axis and Y axis is acute angle, an adjoined tooth with small Y coordinate is given a subscript of small_idx, an adjoined tooth with great Y coordinate is given a subscript of big_idx. $\vec{d}$ is used to represent the normal of the longest axis' projection on XY plane, where the longest axis is obtained by PCA analysis. Use $C_{OBB}$ to represent the center of oriented bonding box, the first term of Equation (25) may be defined as follows:

$$P'_t = \max\left(\min\left(\frac{f_t - C_{OBB} \cdot \vec{d}}{maxWidth}, maxProb\right), minProb\right) \quad \text{Equation (26)}$$

$$P_t = P'_t(maxProb - minProb) + 0.5 * (maxProb + minProb) \quad \text{Equation (27)}$$

$$\xi U(p_t, l_t) = \begin{cases} -\log(P_t), & \text{if } l_t = \text{tooth with big\_idx} \\ -\log(1 - P_t), & \text{if } l_t = \text{tooth with small\_idx} \end{cases} \quad \text{Equation (28)}$$

where, $f_t$ stands for coordinates of center point of facet t, default value of $\lambda$, is 50, default value of minProb is $10^{-8}$, maxProb=1−minProb.

After adjoined teeth are segmented, their boundaries may be further verified. For each tooth, two thresholds may be set, where the longest axis obtained by PCA analysis shall be less than one of the threshold, and surface area of each of the segmented tooth shall be greater than the other threshold. If any of the two conditions is not met, it is determined that the boundaries are not correct, and there shall be no adjoin between the two teeth.

After segmentation, teeth may be labeled. If former label of two adjoined teeth is 1, for the two segmented teeth, there are only two possible labeling: (1−1,1) or (1,1+1), where 1∈[1, 8], 1 represents central incisor and 8 represents third molar. Counting from central incisor to third molar, use $Count_{prev}$ to represent number of teeth before current tooth, and use $Count_{next}$ to represent number of teeth after current tooth, labeling of two adjoined teeth after segmentation may be determined according to below rules.

1. If $Count_{prev}+Count_{next} \geq 7$, $label_{new}=\{1,1\}$, there is no adjoin;
2. If the above is false and $Count_{next}+1=8$, $label_{new}=\{1-1,1\}$;
3. If the above are false and $Count_{prev}=1-1$, $label_{new}=\{1, 1+1\}$;
4. If the above are false and there is an adjacent tooth $Tooth_{idx}=1-1$, $label_{new}=\{1.1+1\}$;
5. If the above are false, for the tooth having smaller label, use $Area_{l-1,now\_idx}$ to represent its surface area under the prediction that it is labeled 1, and use $Area_{l-1,small\_idx}$ to represent its surface area under the prediction that it is labeled 1−1, there is:

$$ratio_1 = \frac{Area_{l-1,small\_idx}}{Area_{l-1,now\_idx}} \qquad \text{Equation (29)}$$

similarly, for the tooth having greater label, use $Area_{l,now\_idx}$ to represent its surface area under the prediction that it is labeled 1, and use $Area_{l,big\_idx}$ to represent its surface area under the prediction that it is labeled 1+1, there is:

$$ratio_2 = \frac{Area_{l,big\_idx}}{Area_{l,now\_idx}} \qquad \text{Equation (30)}$$

If $ratio_1 > ratio_2$, $label_{new}=\{1.1+1\}$, otherwise, $label_{new}=\{1-1.1\}$.

In the new labeling process, some obvious prediction errors may be detected.

1. If a tooth is predicted to be third molar, and there is a first molar next to it, then it should be re-labeled as second molar.
2. In practice, in many cases, second premolar is labeled as first molar by mistake. Therefore, if there is only one premolar and it is very close to first molar, it can be labeled as second premolar.

After segmentation of the simplified 3D model is finished, the result shall be mapped to the original 3D model. Because the simplified 3D model and the original 3D model have mapping relationship, Approximate Nearest Neighbor (hereinafter "ANN") algorithm may be used to map labels to the original 3D model as well as probabilities of the labels. After mapping, labels may be further optimized on the original 3D model.

Since the simplified 3D model and the original 3D model have mapping relationship, a predicted label on the original 3D model can be approximately regarded as its nearest facet on the simplified 3D model. To improve efficiency, ANN algorithm may be used to compute approximate solution.

In the mapping, probabilities of prediction may also be mapped to the original 3D model. To respect the optimization on the simplified 3D model, in the mapping, probability of prediction of a facet to be 1 may be increased by a fixed value (a small neighborhood besides boundary), then probabilities may be normalized. It should be noted that since prediction of boundaries may not be reliable, probabilities on boundaries remain unchanged in mapping.

After label optimization on the simplified 3D model, there still may be some problems on boundaries, such as there may be residue or boundaries may not be smooth in triangular areas (interdental papilla). Therefore, boundaries may also be optimized. In one embodiment, boundary optimization may include the following two parts: (1) optimize interdental residue area or repair opening on tooth boundary using Fuzzy Clustering Algorithm; (2) smoothen boundary using shortest path algorithm.

Please refer to "Hierarchical Mesh Decomposition Using Fuzzy Clustering and Cuts" Acm Transactions on Graphics, 22(3):954{961, 2003 by Sagi Katz and Ayellet Tal, Fuzzy Clustering and Cuts algorithm may be used to find the best boundary in a fuzzy area.

Therefore, in optimization, a fuzzy area may be defined for each tooth, it shall cover boundary of the tooth and shall be as small as possible. Since tooth boundaries have different shapes and some boundaries are smooth, the above methods may not manage boundary properly, the results neural network generates shall be considered and used in optimization.

Use S to represent facet set of fuzzy area facets that adjoin with confidence tooth area, use T to represent facet set of fuzzy area facets that adjoin with confidence gingiva area or other tooth. To find a good boundary in fuzzy area, Graph Cut algorithm may be used, and below minimized energy function which is similar with Equation (6) may be established:

$$E(x)=\Sigma_{i\in v}E_{unary}(i)+\lambda\Sigma_{(i,j)\in \varepsilon}E_{pairwisenew}(i,j) \qquad \text{Equation (31)}$$

where, $$E_{pairwisenew}(i,j)=\omega E_{pairwise}(i,j) \qquad \text{Equation (32)}$$

where, $$E_{pairwise}(i,j) = \begin{cases} \dfrac{w}{1+\dfrac{Ang_{Dist}}{avg(Ang_{Dist})}} & \text{if } i,j \neq S,T \\ \infty & \text{else} \end{cases} \qquad \text{Equation (33)}$$

(33) where, $$Ang_{Dist(\alpha_{ij})}=\eta(1-\cos \alpha_{ij}) \qquad \text{Equation (34)}$$

where, $\eta$ is a small positive number, $\alpha_{ij}$ stands for angle between normals of two adjacent facets i and j. It should be noted that for facets in T, magnitudes of $E_{pairwise}$ for T and facets that adjoin with other teeth are smaller.

$\omega$ is a parameter of improved fuzzy clustering algorithm as weight of $E_{pairwise}$, it is basis prediction of neural network to certain extent i.e. distance between facets and predicted boundary.

$$\omega = \frac{1}{1+\exp\left(-\dfrac{x^2}{\sigma}\right)} \qquad \text{Equation (35)}$$

where, x stands for the shortest geodesic distance from central point of a facet to predicted boundary, its unit is mm, σ is a fixed value, its default value may be 0.05.

Angle between adjacent facets is a very important component of local feature, so when it is taken as a component in optimization, boundary can be better optimized.

In optimization of each tooth, to accurately define boundary of a fuzzy area, a method similar to bidirectional breadth first search may be used i.e. conduct bidirectional breadth first search from a current boundary and a possible boundary. A possible boundary is formed by vertices on tooth or gingiva that have maximum curvatures which are within a pre-set range, if the boundary is determined to be an interdental boundary, then this area can not be possible boundary, and it shall be removed and protected. In one embodiment, the following algorithms may be used to locate tooth fuzzy area.

---

Algorithm 1 Algorithm for Locating Tooth Fuzzy Area

---

1: procedure FIND PROTECTED REGION (mesh, para)
2:     initialize conduct curvature analysis for every vertex on mesh
3:     initialize protectfList is empty
4:     for traversing all boundary lines on mesh e do
5:         if e is interdental boundary and curvatures of two vertices of e are within a pre-set range, then
6:         end if
7:         add two facets adjacent to e into protectfList
8:     end for
9:     conduct breadth first search using protectfList as seed set, para.protectPropagate layer, and add all traversed facets in protectfList.
10:    set protect variable of all facets in protectfList to true
11: end procedure

---

Algorithm 2 Algorithm for Locating Tooth Fuzzy Area

---

1:    procedure FIND FUZZY REGION (fuzzyFaceList, mesh, para)
2:        initialize identify facets adjacent to boundary between current tooth and gingiva, and add the identified facets in cbList
3:        roughfList = cbList
4:        conduct breadth first search using cbList as seed set, para.roughPropagate layer and measured distance to boundary less than para.geodesicPropagateTh, add all traversed facets in roughfList, ΔroughfList is possible fuzzy area
5:    initialize possible boundary set pbList is empty
6:    for traverse all facets in roughfList f do
7:        if protect of f is false and f has two vertices whose maximum curvatures are within a pre-set range then
8:            add f in pbList
9:        end if
10:   end for
11:   initialize roughRegion and roughfList have the same size, initial value 0
12:       conduct breadth first search using cbList as seed set, para.basePropagate + para.nextPropagate, and calculate angular distance from facet to original boundary, it is required that angular distance shall be less than para.angDistThreshold when traversing.  Set roughRegion of facets whose traverse layer is less than para.basePropagate to 2, increase roughRegion of other facets by 1
13:       conduct breadth first search using pbList as seed set, para.basePropagate + para.nextPropagate, do not calculate angular distance. Assignment of roughRegion is similar to above.
14:   initialize fuzzyFaceList is empty
15:   traverse roughfList, if roughRegion of corresponding position greater than or equals 2, add this facet in fuzzyFaceList return fuzzy area fuzzy FaceList
16:   end procedure

---

After optimization using improved fuzzy clustering algorithm, there may still be unsmooth area on boundary. Therefore, a tooth boundary may be further optimized basis salient point removal and shortest path. If two facets adjacent to a current facet have a same label which is different with that of the current facet, then the common node of the three facets is a convex point. After several iterations, all convex points can be removed.

Figure 3:
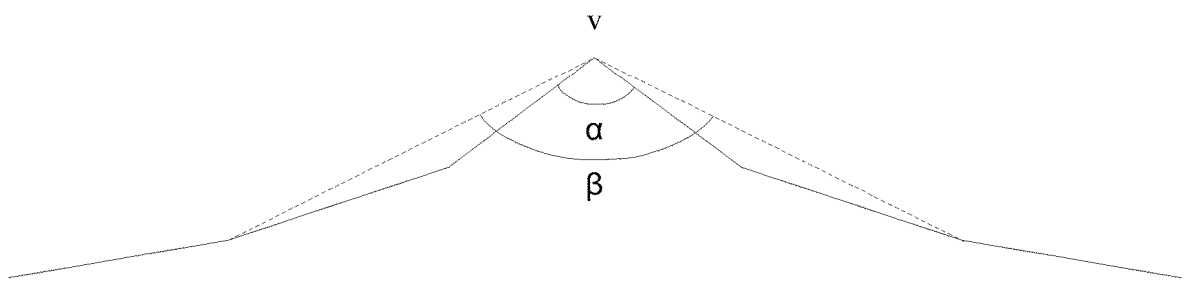
FIG. 3 schematically illustrates how to define a narrow band area according to one embodiment of the present application.

Salient point removal is local optimization only, so shortest path method may be used to smoothen the original boundary. Shortest path algorithm may be conducted in a narrow band neighbourhood of a boundary. Please refer to FIG. 3, a method for defining a narrow band neighbourhood is that for each vertex v, calculate two angles α and β, add 1 neighbourhood vertex or 2 neighbourhood vertex of boundary vertices whose α and β are greater than predetermined thresholds in narrow band neighbourhood.

After a narrow band neighbourhood is defined, a new boundary can be defined using shortest path method.

In such method, length e of side $v_1v_2$ may be defined as:

$$e_{v_1v_2} = e_{Euclidian} + \lambda e_{ang\_dist} \qquad \text{Equation (35)}$$

where, $$e_{ang\_dist} = \begin{cases} \eta \dfrac{1+\cos\alpha}{2}, & \alpha < T \\ \dfrac{1+\cos\alpha}{2}, & \text{else} \end{cases} \qquad \text{Equation (36)}$$

where, α stands for an angle between normals of two adjacent facets whose common side is $v_1v_2$, η is a great positive number. The reason why angular distanced is used is that the smaller α the shorter side.

Now, a segmented 3D digital model of jaw is obtained.

There are many equations in this disclosure, it is understandable basis the above detailed description that a same symbol in different equations may represent different contents, and different symbols in different equations may represent same content.

It is understandable that there are many different kinds of deep artificial neural networks and different neural network structures that can be used to segment 3D digital models of jaw, and there are different optimization methods for different processes, therefore, the scope of the present disclosure shall not be limited to the above embodiments.

The following articles are cited for reference in this disclosure, the contents of which are incorporated herein:

[1] Evangelos Kalogerakis, Aaron Hertzmann, and Karan Singh. Learning 3D Mesh Segmentation and Labeling. ACM Transactions on Graphics, 29(3), 2010.
[2] Y Boykov, O. Veksler, and R. Zabih. 2001. Fast Approximate Energy Minimization Via Graph Cuts. IEEE TPAMI23, 11, 1222-1239.
[3] Sagi Katz and Ayellet Tal. Hierarchical Mesh Decomposition Using Fuzzy Clustering and Cuts. Acm Transactions on Graphics, 22(3):954{961, 2003.
[4] Kan Guo, Dongqing Zhou, and Xiaowu Chen, 3D Mesh Labeling Via Deep Convolutional Neural Networks. Acm Transactions on Graphics, 35(1); 3, 2015.

While various aspects and embodiments have been disclosed herein, other aspects and embodiments will be apparent to those skilled in the art. The various aspects and embodiments disclosed herein are for purposes of illustration and are not intended to be limiting, with the true scope and spirit being indicated by the following claims.

Likewise, the various diagrams may depict an example architectural or other configuration for the disclosed method and apparatus, which is done to aid in understanding the features and functionality that can be included in the disclosed method and apparatus. The claimed invention is not restricted to the illustrated example architectures or configurations, but the desired features can be implemented using a variety of alternative architectures and configurations. Additionally, with regard to flow diagrams, operational descriptions and method claims, the order in which the blocks are presented herein shall not mandate that various embodiments be implemented to perform the recited functionality in the same order unless the context dictates otherwise.

Unless the context dictates, terms used herein are generally intended as "open" terms instead of limiting. The use of phrases such as "one or more", "at least" and "but not limited to" should not be construed to imply that the parts of the present application that do not use similar phrases intend to be limiting.

We claim:

1. A computer-implemented method for segmenting 3D digital model of jaw, the method comprising:
   Obtaining a first 3D digital model of jaw of a patient scanned by a scanning device;
   extracting features based on the first 3D digital model of jaw and feeding the extracted features to a trained deep artificial neural network;
   segmenting the first 3D digital model of jaw using the trained deep artificial neural network;
   optimizing boundaries obtained by the segmenting, the optimizing being based on a fuzzy clustering algorithm containing a component of angle between adjacent facets to increase the probability that a common side of two adjacent facets having a small angle therebetween will be identified as a part of a boundary.

2. The method of claim 1, wherein the trained deep artificial neural network is trained using multiple segmented 3D digital models of jaw.

3. The method of claim 1 further comprising: simplifying the first 3D digital model of jaw before the segmenting by contracting a part of vertices of facets of the first 3D digital model of jaw.

4. The method of claim 3, wherein gingiva part of the first 3D digital model of jaw is more simplified than teeth part.

5. The method of claim 3, wherein algorithm of the simplifying contains a component of angle between adjacent facets to lower the probability that two adjacent facets having a small angle therebetween will be simplified.

6. The method of claim 1, wherein the artificial neural network is convolutional neural network.

7. The method of claim 6, wherein the artificial neural network comprises a first convolutional neural network and a second convolutional neural network, the first convolutional neural network is for classifying facets into one of gingiva and tooth, and the second convolutional neural network is for classifying the facets, classified into tooth by the first convolutional neural network, into one of different tooth types.

8. The method of claim 7, wherein the second convolutional neural network is able to classify facets into one of the following eight tooth types: central incisor, lateral incisor, canine, first premolar, second premolar, first molar, second molar and third molar.

9. The method of claim 7, wherein at least one of the first and the second convolutional neural networks comprises the structure of "convolution layer-convolution layer-pool layer".

10. The method of claim 9, wherein at least one of the first and the second convolutional neural networks comprises the structure of "convolution layer-convolution layer-pool layer-convolution layer-convolution layer-pool layer".

11. The method of claim 7, wherein at least one of the first and the second convolutional neural networks comprises the structure of "full connected layer-dropout-full connected layer".

* * * * *